United States Patent [19]

Potter

[11] Patent Number: 4,984,600

[45] **Date of Patent: * Jan. 15, 1991**

[54] SELF CORRECTING NOZZLE USEFUL WITH CURRENT TO PRESSURE TRANSDUCER

[75] Inventor: Robert I. Potter, San Jose, Calif.

[73] Assignee: Alum Rock Technology, San Jose, Calif.

[*] Notice: The portion of the term of this patent subsequent to Oct. 17, 2006 has been disclaimed.

[21] Appl. No.: 414,395

[22] Filed: Sep. 29, 1989

[51] Int. Cl.[5] .............. G05D 16/00

[52] U.S. Cl. .............. 137/82; 251/129.08

[58] Field of Search .............. 137/82, 85; 251/129.08, 251/129.21

[56] References Cited

U.S. PATENT DOCUMENTS

| | | | |
|---|---|---|---|
| 3,982,554 | 9/1976 | Saito | 137/82 |
| 4,579,137 | 4/1986 | Brandt | 251/129.08 X |
| 4,771,983 | 9/1988 | Sakaguchi | 251/129.08 |
| 4,825,894 | 5/1989 | Cummins | 137/82 |
| 4,846,439 | 7/1989 | Suzuki | 251/129.21 X |

FOREIGN PATENT DOCUMENTS

| | | | |
|---|---|---|---|
| 1553302 | 12/1968 | France . | |
| 1140785 | 1/1969 | United Kingdom . | |
| 2136542 | 9/1984 | United Kingdom | 137/82 |
| 2181818 | 4/1987 | United Kingdom . | |

*Primary Examiner*—Alan Cohan

*Attorney, Agent, or Firm*—Nathan N. Kallman

[57] ABSTRACT

A nozzle and pole piece are formed from a single magnetic part so that the ends of the nozzle and pole piece are substantially coplanar. When used with a current-to-pressure transducer, the coplanar design allows proper alignment of the diaphragm employed for sealing the nozzle without canting and misalignment of the diaphragm. The integral nozzle and pole piece structure is relatively easy to machine and manufacture.

7 Claims, 3 Drawing Sheets

SELF CORRECTING NOZZLE USEFUL WITH CURRENT TO PRESSURE TRANSDUCER

CROSS-REFERENCE TO COPENDING PATENT APPLICATION

A current-to-pressure transducer is disclosed in copending patent application Ser. No. 07/281,125, filed Dec. 7, 1988 on behalf of Robert I. Potter now U.S. Pat. No. 4,874,005 issued Oct. 17, 1989. The copending application is incorporated herein by reference. The self-correcting nozzle disclosed in the instant application is applicable for use with the current-to-pressure transducer of the aforementioned allowed application.

FIELD OF THE INVENTION

This invention relates to a nozzle that is useful with a current-to-pressure transducer and in particular to a self-correcting nozzle structure.

BACKGROUND OF THE INVENTION

Description of the Prior Art

A nozzle is a converging or converging-diverging tube attached to the outlet of a pipe, hose or pressure chamber. The purpose of the nozzle is to convert the pressure existing in a fluid into velocity efficiently. A nozzle allows a pressure to be carried in a pipe or hose adjacent to the nozzle.

In the current-to-pressure transducer disclosed in the aforementioned copending application, a flexible membrane or diaphragm is used to vary the air space between the diaphragm and a nozzle. The nozzle is connected to an air line for regulating the pressure of the air within the air supply line. The diaphragm responds to electromagnetic forces exerted on a magnetic fluid and the diaphragm is moved by the magnetic fluid towards the nozzle to narrow the space through which the air flowing from the nozzle is passed to the ambient environment. The magnetic fluid and the diaphragm move in accordance with an electric input current that is applied to an electrical coil associated with a magnetic circuit. The movement of the flexible diaphragm towards the nozzle decreases the flow of air from the nozzle and increases the pressure of the air within the air supply line.

Presently known nozzles used for controlling air flow generally terminate with an outer diameter slightly larger than the inner diameter. Typically, the outer diameter of a nozzle would be 0.035 inch and the inner diameter would be 0.026 inch, by way of example. The current-to-pressure transducers that use such type nozzles usually incorporate a flapper, which is a pivotable paddle-shaped part, or a diaphragm to vary the flow of air through the nozzle. In either case, it is necessary that a good seal be provided at the end of the transducer from which there is the high flow of air or fluid. In order to achieve the required good seal, the flapper or diaphragm must be precisely aligned in a plane that is perpendicular to the axis of the nozzle. If the alignment is not proper, the flapper or diaphragm will first strike an edge of the nozzle end and will not advance further towards making an effective complete seal. It is relatively difficult to provide the desired orthogonal alignment of the flapper or diaphragm in a planar orientation relative to the nozzle axis.

SUMMARY OF THE INVENTION

An object of this invention is to provide a nozzle and pole piece structure that affords an effective complete seal at the nozzle end from which fluid or air flows to the ambient environment.

Another object of this invention is to provide an integral nozzle and pole piece structure which is easier to manufacture than prior known nozzles of this type.

According to this invention, a self-correcting nozzle and pole piece structure that is useful with a current-to-pressure transducer is formed from an integral piece of magnetic material. The nozzle and pole piece structure is formed so that the respective ends of the nozzle and pole piece which face the sealing element, which in this case is a flexible diaphragm, are coplanar. The nozzle structure provides a self-correcting feature that compensates for any canting or misalignment of the diaphragm. Slots are provided at the end of the integral piece facing the diaphragm to allow the escape of excess air.

BRIEF DESCRIPTION OF THE DRAWING

The invention will be described with reference to the drawing in which.

Similar numerals refer to similar elements throughout the drawing.

DESCRIPTION OF THE PREFERRED EMBODIMENT

Figure 1:
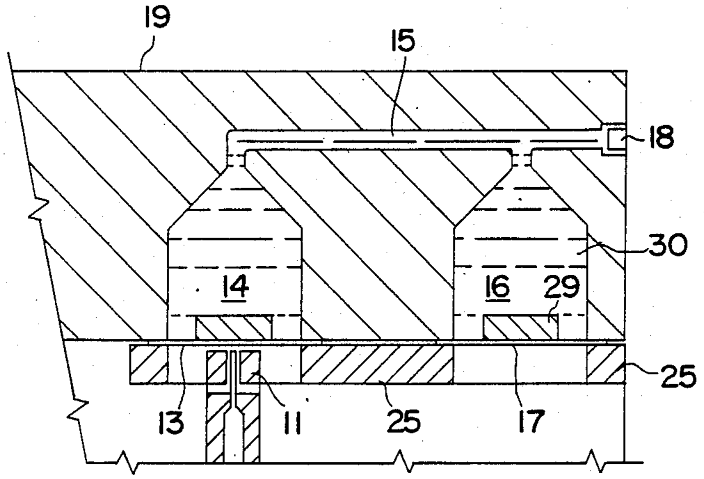
FIG. 1 is a cross-sectional view of a current-to-pressure transducer, partly broken away, such as disclosed in the referenced copending patent application.
Figure 2:
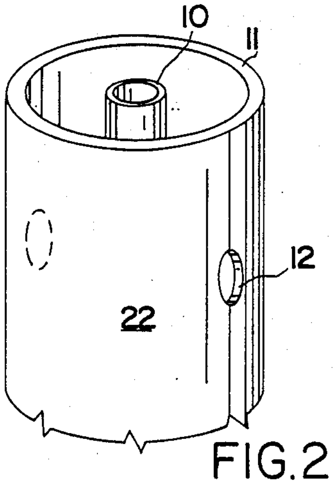
FIG. 2 is an enlarged isometric view showing the relationship of a pole piece to a nozzle, as used with the transducer of FIG. 1.

With reference to FIGS. 1 and 2, a current-to-pressure transducer, such as disclosed in the referenced copending patent application, is formed with a baseplate 19 having two spaced chambers 14 and 16 that are connected by a capillary tube 15. A magnetic fluid 30 is contained within the chambers 14 and 16 and in a capillary tube 15 which connects the chambers.

Flexible membranes 13 and 17 are located respectively at the lower open ends of the chambers 14 and 16 to seal the ends of the chambers and to contain the magnetic fluid 30 within the chambers. The flexible membranes 13 and 17 are retained by a nonmagnetic retainer element or ring 25 that abuts the diaphragms. The element 25 is fastened at its exposed surface to the baseplate 19 by screws or other suitable means.

An electromagnetic circuit, which includes an electrical coil (not shown), coacts with the magnetic flux of a pole piece 11 formed from a magnetic tube 22 to move the magnetic fluid 30 in response to electric current which is applied to the coil causing the deformation of the diaphragm 13. The flow of air from a nozzle 10 is regulated by the current and the movable diaphragm 13.

In the embodiment disclosed in the referenced application, transverse holes 12 are provided to allow the escape of excess air.

Figure 3:
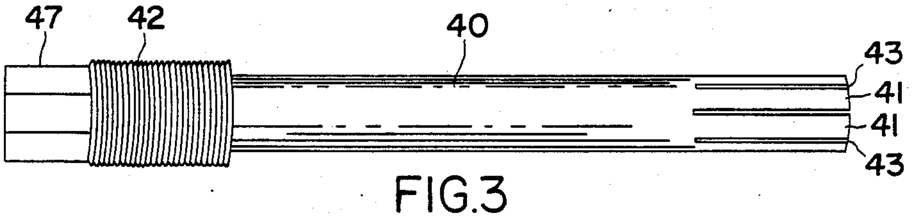
FIG. 3 is a side view of the nozzle and pole piece, made in accordance with this invention.

In accordance with this invention, a nozzle and pole piece structure is formed from a rod 40 made f a magnetic material, such as Carpenter High Permeability "49" Alloy, for example. The rod 40 has a diameter of about 3/16 inch in this particular embodiment. As illustrated in FIG. 3, the magnetic rod 40 is formed with functional pole pieces 41 at a slotted end of the rod 40. Slots 43 allow the escape of excess air and are relatively easy to machine, with saw blades or slot cutters, as compared to the formation of individual bleed holes 12 and the associated deep circumferential groove between elements 10 and 11 to which the holes connect, shown in FIG. 2. The pole pieces 41 provide magnetic flux for coaction with electric current flowing through the electrical coil (not shown) of the electromagnetic circuit. Application of electric current to the coil causes the magnetic fluid 30 to move which, in turn, causes the deformation of the flexible diaphragm as explained heretofore thereby controlling air flow through the nozzle .

Figure 6:
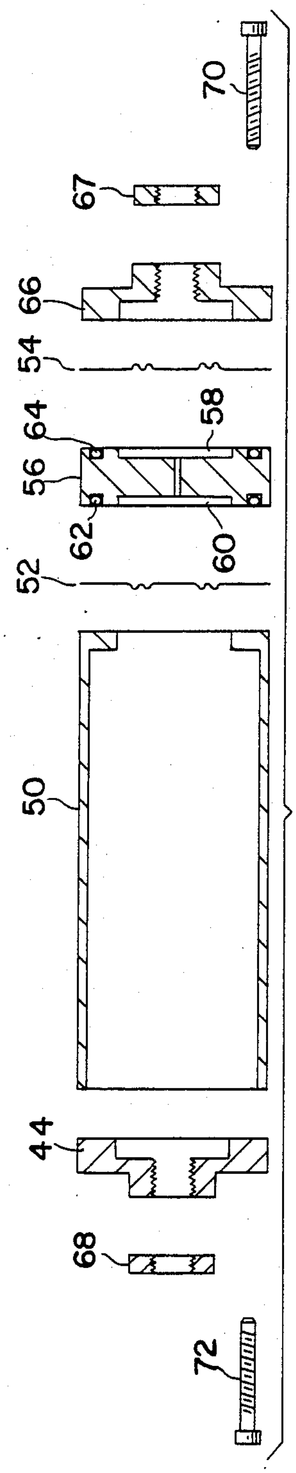
FIG. 6 is an exploded view of an assembly drawing illustrating the housing which encloses the nozzle and pole piece structure.

The rod 40 has a threaded part 42 for engagement with a threaded cap 44 of a housing assembly, shown in FIG. 6. The rod 40 also has a hexagonal part 47 formed at the end adjacent to the threaded part 42 to allow the rod to be turned so that the height of the nozzle relative to the diaphragm can be adjusted for proper operation, and locked with nut 68.

Figure 4:
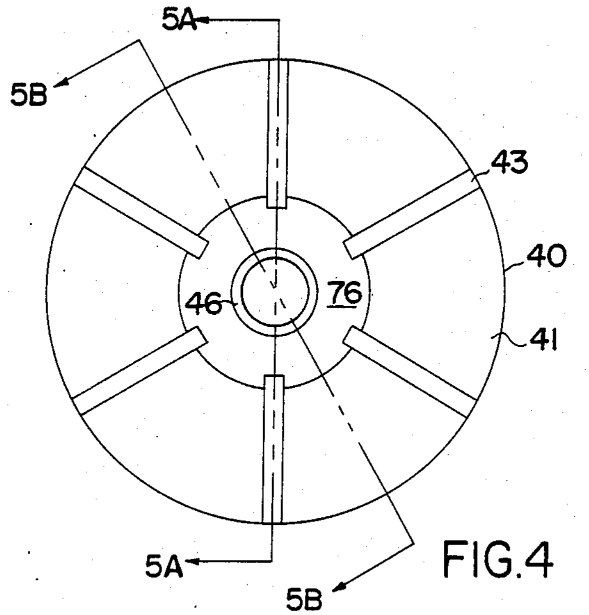
FIG. 4 is an end view at the slotted end of the nozzle and pole piece structure, such as illustrated in FIG. 3.

FIG. 4 shows an end view of the nozzle and pole piece structure 40 viewed from the slotted end. The rod 40 is formed with one or more of the longitudinal slots 43, which extend inwardly to at least the outer diameter of a relatively shallow groove 76 formed within the end of the rod 40. The slots 43 serve the same purpose as the holes 12 depicted in FIG. 2 to allow the escape of excess air, but are easier to machine and fabricate than the transverse holes. Groove 76 may be eliminated if the slots 43 extend inward to the proximity of the constricted passage 49 (FIGS. 5A and 5B).

Figure 5A:
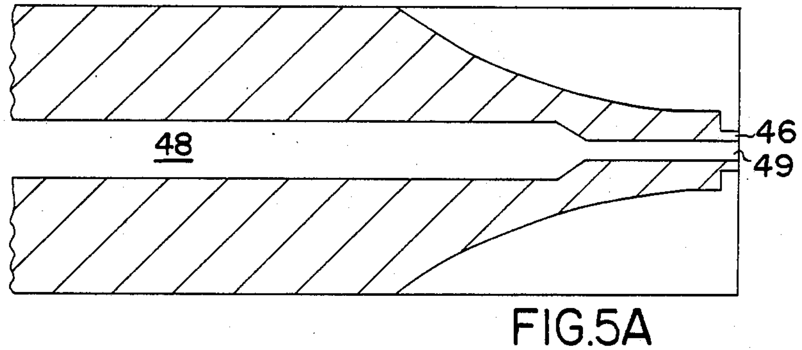
FIG. 5A is an enlarged cross-sectional view, partly broken away, taken across lines A—A' of FIG. 4.
Figure 5B:
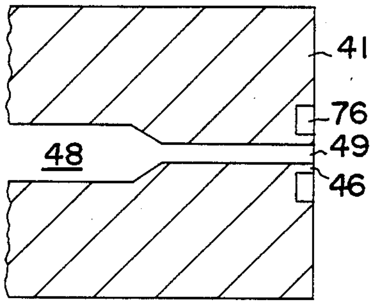
FIG. 5B is an enlarged cross-sectional view, partly broken away, taken across lines B—B' of FIG. 4.

As depicted in FIGS. 5A and 5B, an open channel 48 is formed within the interior of the rod 40 to allow the passage and escape of air. The channel 48 may be tapered at the end portion that faces the diaphragm so that a constricted passage 49 is formed at the end of the channel 48. The constricted portion 49 of the channel 48 (FIGS. 5A and 5B) reduces the volume of air that escapes from the nozzle at a given pressure and defines the cross-sectional area which diaphragm 13 must seal. The amount of air flow from the constricted portion 49 is regulated by the position of the diaphragm 13, which is controlled by the action of the magnetic fluid in response to the electric current supply to the coil of the electromagnetic circuit.

The inner diameter of groove 76, and the diameter of the constricted portion 49, and that portion of the surface of pole piece 41 bounded by these two diameters form the nozzle tube 46.

The exploded view of FIG. 6 shows the main housing 50 for the integral nozzle and pole piece structure which is made of soft iron. Diaphragms 52 and 54 are spaced by a soft iron spacer 56 formed with magnetic fluid chambers 58 and 60. O-ring seals 62 and 64 are provided with the chambers. A threaded aluminum retainer 66 is located adjacent to the diaphragm 54 for connection to the spacer 56. A lock nut 67 is located against the retainer 66 and four cap screws 70 tie the spacer 56 and retainer 66 with the diaphragms 52 and 54 to the main housing 50. A second nozzle (not shown) may be threaded into retainer 66 to coact with diaphragm 54, as described in the referenced copending application.

At the other end of the housing 50, the threaded element 44, which is made as a soft iron cap with internal threads for engaging the nozzle, is joined with a lock nut 68 by means of four Allen socket cap screws 72 to the main housing 50.

Figure 7:
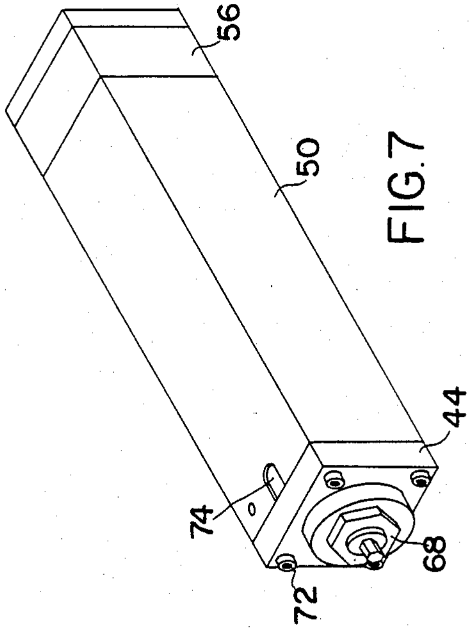
FIG. 7 is an isometric view illustrating an assembled housing which encloses the nozzle and pole piece structure of this invention.

FIG. 7 depicts the assembled unit which has a notch 74 in the housing 50 to allow connection of electrical circuitry to the electrical coil of the electromagnetic circuit and to permit escape of excess air.

By virtue of the integral structure of a nozzle and pole piece which are machined from a single magnetic rod, the end of the nozzle tube 46 and the end of the pole piece 41 are substantially coplanar. When the electromagnetic force is applied to the top surface of the diaphragm 13 by the magnetic fluid 30, the lower surface of the diaphragm conforms to the shape of the pole piece 41. Since the alignment of the ends of the pole piece 41 and nozzle tube 46 are in substantial planar alignment, the diaphragm will provide a complete seal at the face of the nozzle. With the present design, the torque applied to the flapper valve acts through a point further from the nozzle than the point of first contact between the flapper valve and nozzle 10, and if the flapper valve does not contact the nozzle squarely, further torque will only distort the flapper valve and worsen the incomplete seal. With the nozzle and pole piece structure design as disclosed herein, any canting of the diaphragm 13 is self-corrected because the force on the diaphragm acts between a point of first contact of the diaphragm 13 with the end of the larger diameter pole piece 41 and the coplanar end of the nozzle tube. The integral nozzle and pole piece structure also is easier to fabricate with the slots 43 formed at the end of the rod structure to allow the desired air escape instead of with transverse holes as used in prior nozzle assemblies. Such transverse holes either require a difficult process to machine a deep groove between the nozzle 10 and pole piece 11, or require fabricating the nozzle 10 and pole piece 11 separately, in which case it would be difficult to assemble these parts to achieve the desired coplanarity.

What is claimed is:

1. A current-to-pressure transducer comprising:

a baseplate or housing made of magnetic material:

at least one chamber formed in said baseplate, said chamber having at least one open end;

at least one flexible membrane or diaphragm for sealing said open end;

a volume of magnetic fluid contained within said chamber;

air supply means disposed closely adjacent to said flexible membrane or diaphragm for supplying air;

an integral nozzle and pole piece structure comprising:

a longitudinal rod made of magnetic material;

a nozzle tube formed in a central portion of said rod for allowing the passage of air received from said air supply means;

one end of said rod forming a magnetic pole piece, an end of said pole piece and an end of said nozzle tube being in a plane substantially coplanar with said one end of said rod.

2. A transducer as in claim 1, including a threaded element seated on a portion of said rod adjacent to the other end of said rod, a housing cap for engaging said threaded element, and means formed integral with said rod for manually rotating said rod and said threaded element for adjusting the position of said nozzle tube.

3. A transducer as in claim 1, wherein said nozzle tube encompasses an air channel, said nozzle tube being tapered at one end to form a constricted portion of said air channel for changing the pressure of said air flow.

4. A transducer as in claim 1, including a housing for containing said nozzle and pole piece structure.

5. A transducer as in claim 4, including an opening formed in said housing for allowing access of electrical circuit connection and for permitting escape of excess air.

6. A transducer as in claim 1, including slots which are slitted longitudinally in the peripheral surface of said rod at one end of said rod, said slots being parallel to the longitudinal axis of said rod for allowing the escape of air.

7. A transducer as in claim 6, including a groove encompassing said nozzle tube, said slots being connected to said groove.

* * * * *